(12) United States Patent
Xie (10) Patent No.: US 11,220,983 B2
(45) Date of Patent: Jan. 11, 2022

(54) AIR INTAKE SYSTEM FOR OFF ROAD VEHICLE

(71) Applicant: Zhejiang CFMOTO Power Co., Ltd., Zhejiang (CN)

(72) Inventor: Lebang Xie, Hangzhou (CN)

(73) Assignee: Zhejiang CFMOTO Power Co., Ltd., Zhejiang (CN)

( * ) Notice: Subject to any disclaimer, the term of this patent is extended or adjusted under 35 U.S.C. 154(b) by 190 days.

(21) Appl. No.: 16/390,755

(22) Filed: Apr. 22, 2019

(65) Prior Publication Data

US 2020/0332748 A1 Oct. 22, 2020

(51) Int. Cl.
*F02M 35/10* (2006.01)
*F02M 35/024* (2006.01)
*F02M 35/16* (2006.01)
*F02M 25/06* (2016.01)

(52) U.S. Cl.
CPC ...... *F02M 35/10222* (2013.01); *F02M 25/06* (2013.01); *F02M 35/024* (2013.01); *F02M 35/162* (2013.01)

(58) Field of Classification Search
CPC ............. F02M 35/10222; F02M 35/02; F02M 35/024; F02M 35/04; F02M 35/042; F02M 35/161; F02M 35/162; F02M 35/10006; F02M 35/10242; F02M 35/10295; F02M 35/10026; F02M 35/10013; F01M 13/00; F01M 2013/0038; F02D 2250/08
See application file for complete search history.

(56) References Cited

U.S. PATENT DOCUMENTS

| | | | |
|---|---|---|---|
| 5,575,247 A | 11/1996 | Nakayama et al. | |
| 7,246,593 B2 * | 7/2007 | Murphy | F02D 9/08 123/184.57 |
| 7,506,629 B2 * | 3/2009 | Kawamura | F01M 13/0416 123/195 C |
| 7,966,997 B2 * | 6/2011 | Ito | F01M 13/04 123/572 |
| 8,616,188 B2 | 12/2013 | Heckel et al. | |
| 9,506,412 B2 * | 11/2016 | Tsukagoshi | F02D 41/123 |
| 2004/0089250 A1 * | 5/2004 | Iwashita | F01N 3/0842 123/21 |
| 2006/0249115 A1 * | 11/2006 | Hashimoto | F02M 35/10229 123/184.55 |
| 2014/0048052 A1 * | 2/2014 | Subedi | F01M 13/022 123/572 |
| 2016/0102648 A1 * | 4/2016 | Nakayama | F02P 3/0435 123/604 |
| 2016/0333755 A1 * | 11/2016 | Kira | F01M 13/04 |

* cited by examiner

*Primary Examiner* — Grant Moubry
(74) *Attorney, Agent, or Firm* — Shewchuk IP Services, LLC; Jeffrey D. Shewchuk (57) ABSTRACT

An air intake system includes an air cleaner for housing an air filter element therein above an off road vehicle engine, and a surge tank, which buffers the filtered air, at a location beside the engine. A descending tube from the air cleaner connects into a top cover of the surge tank, and an outlet tube of the air intake system extends horizontally from the top cover of the surge tank for connection into the throttle of the engine. A vapor recovery pipe connect the crankcase of the engine, lower than the outlet tube, back up to the air cleaner upstream of the filter element. The surge tank includes a tank bottom casing removably connected to a tank upper cover, with the descending tube and the outlet tube connecting into the tank upper cover.

13 Claims, 6 Drawing Sheets

AIR INTAKE SYSTEM FOR OFF ROAD VEHICLE

CROSS-REFERENCE TO RELATED U.S. APPLICATION(S)

None.

FIELD OF THE INVENTION

The present invention relates to offroad vehicles such as UVs and ATVs, and more particularly to the design and layout of the air intake and air cleaning system for the internal combustion engine in such offroad vehicles.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement.

UVs and ATVs commonly use small internal combustion engines, including single and dual cylinder engines, in which a fuel-air mixture is combusted within the cylinder(s), moving a piston in each cylinder to provide the motive force for the vehicle. Such vehicles often include an air cleaner with an air filter to remove dust and foreign particles from the air used for combustion. Due to their off-road travel over gravel, dirt and sand where considerable amounts of dust can be kicked up where the vehicle is traveling, the air filter and air intake system is particularly important in UVs and ATVs.

The air intake system and air filter has a significant impact on the service life of the vehicle, particularly the engine. On the one hand, if there is no filtering effect of the air filter, the dust and other foreign particles inhaled into the engine will be abrasive and over time cause serious damage to the engine cylinder. On the other hand, if the air filter is not maintained and begins to clog, the dirty filter will impede air flow and/or not effectively remove the damaging particles. Further, the impediment may not happen consistently, and instead may cause uneven air delivery and poor engine operation. Better air intake systems, particularly suited for offroad vehicles such as UVs and ATVs and their one and two cylinder engines, are needed.

BRIEF SUMMARY OF THE INVENTION

The present invention is an air intake system having a layout particularly suitable for an off road vehicle, and an internal combustion engine for an off road vehicle using the air intake system. The air intake system includes an air cleaner for housing an air filter element therein at the top of the air intake system and above the engine. The air intake system also includes a surge tank, which buffers the filtered air, at a location beside the engine. A descending tube from the air cleaner connects into a top cover of the surge tank, and an outlet tube of the air intake system extends horizontally from the top cover of the surge tank for connection into the throttle of the engine. In one aspect, the air intake system includes a vapor recovery pipe from the crankcase of the engine, starting lower than the outlet tube, and extending back up to the air cleaner upstream of the filter element. In another aspect, the surge tank includes a tank bottom casing removably connected to a tank upper cover, with the descending tube and the outlet tube connecting into the tank upper cover, such that the surge tank bottom casing can be removed without further disassembly of the air intake system or engine.

BRIEF DESCRIPTION OF THE DRAWINGS

Throughout the figures, unnumbered arrows generally indicate air flow direction.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

As best shown in FIGS. 1-5, a preferred air intake system 10 of the present invention includes an air intake tube 12 leading to an air cleaner 14. As known in the art, the air cleaner 14 is essentially a housing storing a readily replaceable air filter element (not separately shown), with one or more inlets 16 and one or more outlets 18 directing air flow through the air filter element and then downstream for combustion use by the engine 20. The engine 20 and air intake system 10 are used in an off road vehicle such as any of the utility vehicles ("UVs") and all terrain vehicles ("ATVs") shown in U.S. Pat. Nos. D844,492, D701,469, and in U.S. Patent Pub. Nos. 2019/0031148, 2019/0054797, and 2019/0055875 all incorporated by reference.

The preferred air intake tube 12 takes air from the upper side of the engine 20, at an elevation lower than the air cleaner 14. Accordingly, the air intake tube 12 includes a first horizontal section 22 leading inward toward the centerline of the engine 20 and vehicle, and then turns upward into the air cleaner 14. However, the air intake tube 12 preferably includes a circular flange 24 for attachment of additional air intake duct 26 (shown only in FIG. 5) such as by a hose clamp 28, so the air intake 30 can be directed to a location on the vehicle remote from the engine 20. With a differently shaped air intake duct, the air intake can be at any location on the vehicle desired.

One of the walls of the air cleaner 14 is readily movable to allow access to the interior of the air cleaner 14 for replacement of the air filter element. Further, the air cleaner 14 is preferably positioned relatively close to the engine 20, but in an easily accessible position and orientation. In the preferred embodiment, the air cleaner 14 includes a rear wall 32 that is hingedly attached. Thus, two latches 34 are shown at the top of the air cleaner 14, and two hinges or attachment tabs 36 are shown at the bottom of the air cleaner 14, allowing the rear wall 32 to open at its top and hingedly pivot downward, possibly thereafter completely detaching, such that the air filter element can be easily replaced via access from the rear of the engine 20 and vehicle. The engine 20 is often positioned relatively low in the vehicle to maintain a low center of gravity. Because access is easier near the top of the engine 20, the air cleaner 14 is preferably positioned toward the top of or more preferably above the engine 20, and the air cleaner 14 is preferably the component at the highest elevation in the air intake system 10.

After moving through the air filter element, the air is fed to the intake manifold 38 such as through the throttle plate 40 of the preferred engine 20. Generally, the air intake manifold 38, throttle plate 40, fuel injectors (or carburetor), etc. are all part of the engine 20 assembled as a large unit. The preferred engine 20 includes a round air inlet 42, and the air intake system 10 can connect such as with a circular flange 44 and a hose clamp 46 (best seen in FIGS. 2 and 3), similar to the circular flange 24 of the air intake tube 12. The air flow path of filtered air to the air inlet 42 of the engine 20 should be made quite short and provide little air flow resistance. Shortening the distance from the outlet 18 of the air cleaner 14 to the air inlet 42 of the engine 20 is another reason to position the air cleaner 14 above the engine 20.

The air intake system 10 of the present invention includes an air surge tank 48, where filtered air is stored and buffered. The air surge tank 48 has a cross-section larger than the cross-section of the descending air flow line 50 between the air cleaner 14 and the air surge tank 48 and larger than the cross-sections of the outlet tube 52 and of the air inlet 42 of the engine 20. When the engine 20 is under heavy load and/or undergoes changes in air demand, the gas storage volume of the surge tank 48 compensates for the change of the air flow and pressure at the engine end, so that the output filtered air flow is stable despite changes in engine air demand. Stabilizing the air pressure of the engine 20 makes the engine 20 intake air evenly and helps the engine 20 to work smoothly. The addition of the surge tank 48 avoids the air unevenness caused by the change of the air demand of the engine 20, improving the uniformity of the intake air so that the working process of the engine 20 is stable.

Figure 1:
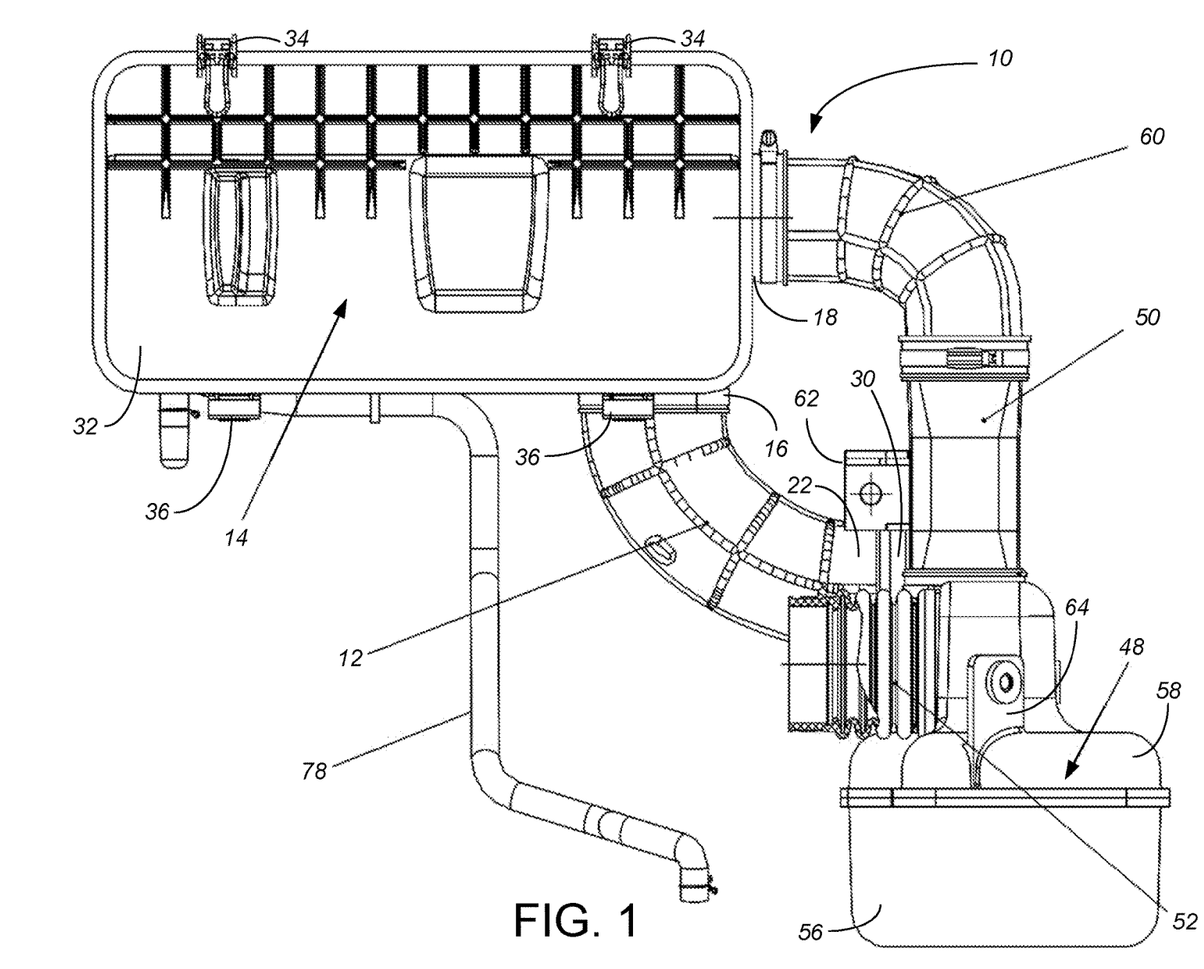
FIG. 1 is a rear elevational view, looking forward on the vehicle, of the air intake system provided by the present invention.
Figure 2:
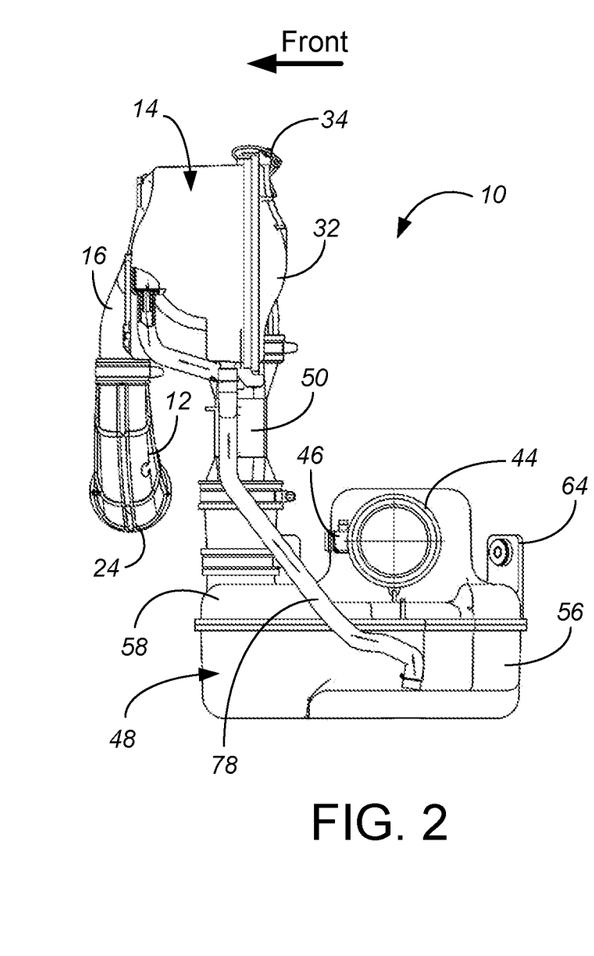
FIG. 2 is a driver's side elevational view of the air intake system of FIG. 1. A partial cross-section is used to better depict the connection between the vapor recovery pipe and the air cleaner.
Figure 3:
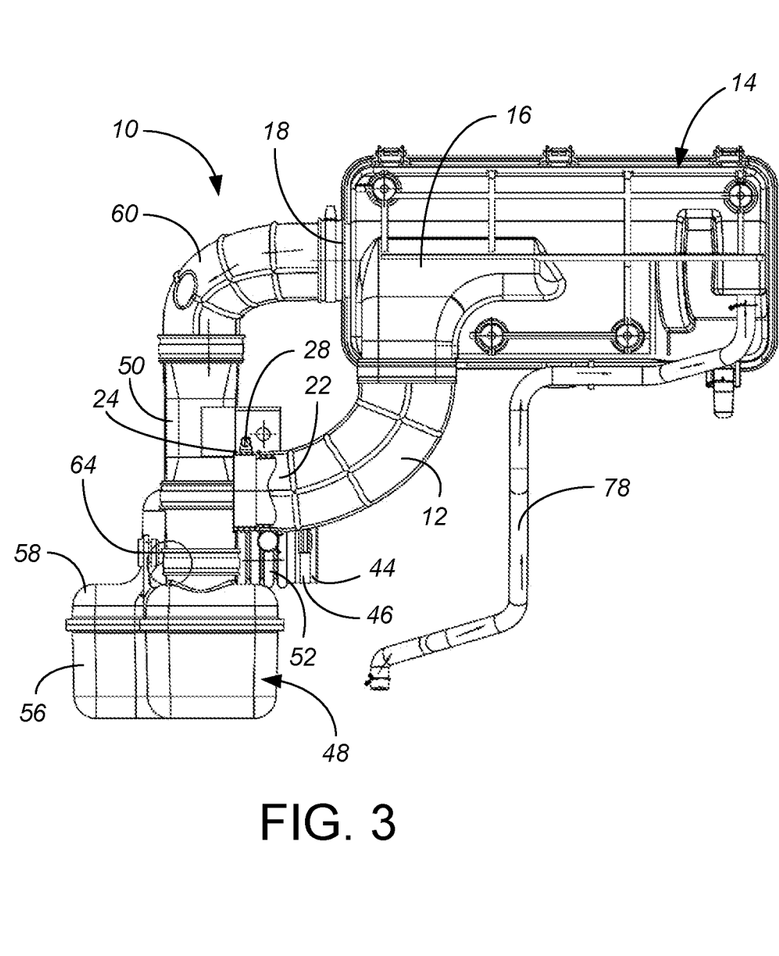
FIG. 3 is a front elevational view, looking rearward on the vehicle, of the air intake system of FIGS. 1 and 2. A partial cross-section shows the inlet of the intake tube.
Figure 4:
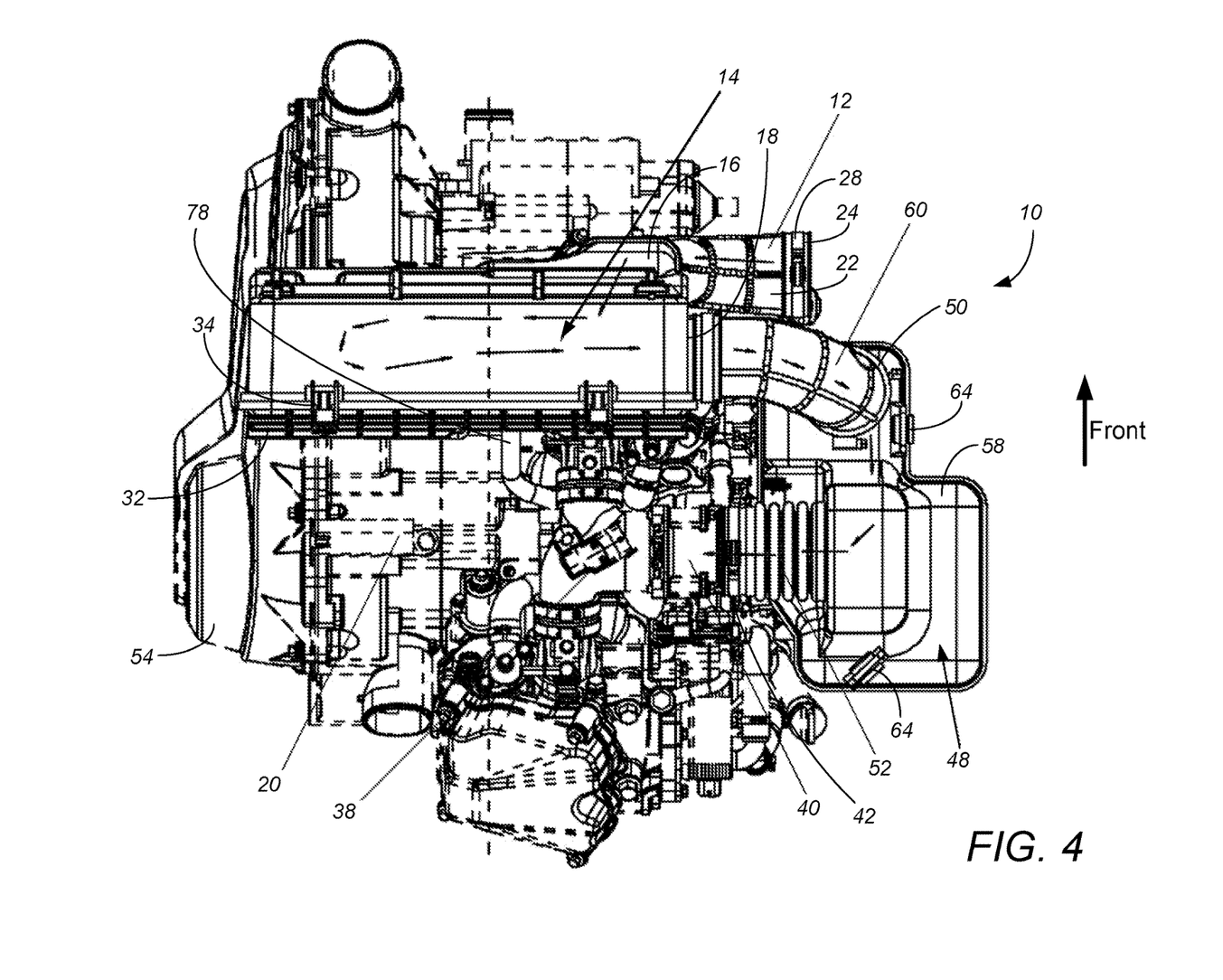
FIG. 4 is top plan view showing the air intake system of FIGS. 1-3 relative to the preferred engine.
Figure 5:
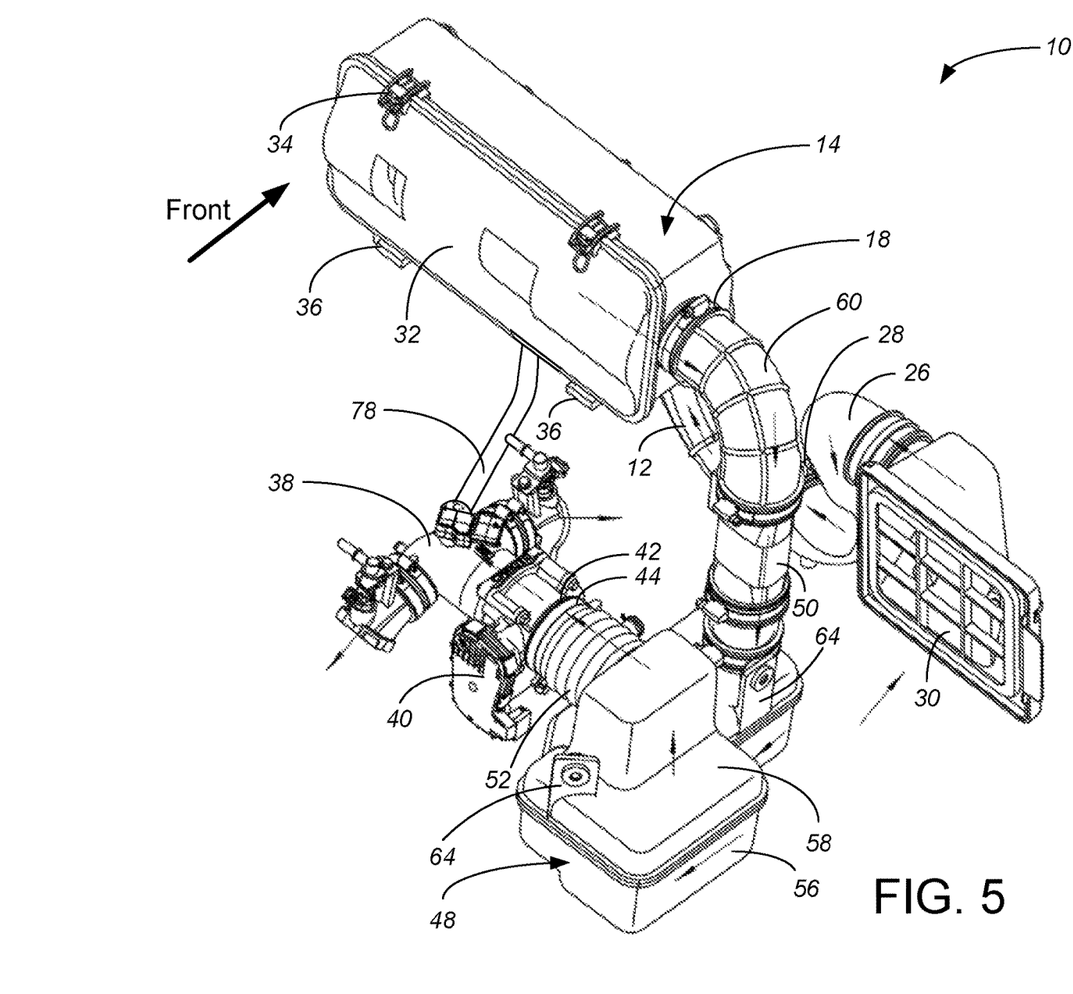
FIG. 5 is a perspective view of the air intake system of FIGS. 1-4, showing only a portion, i.e., only the throttle body and input manifold, of the engine, and showing the air intake.
Figures 6, 7:
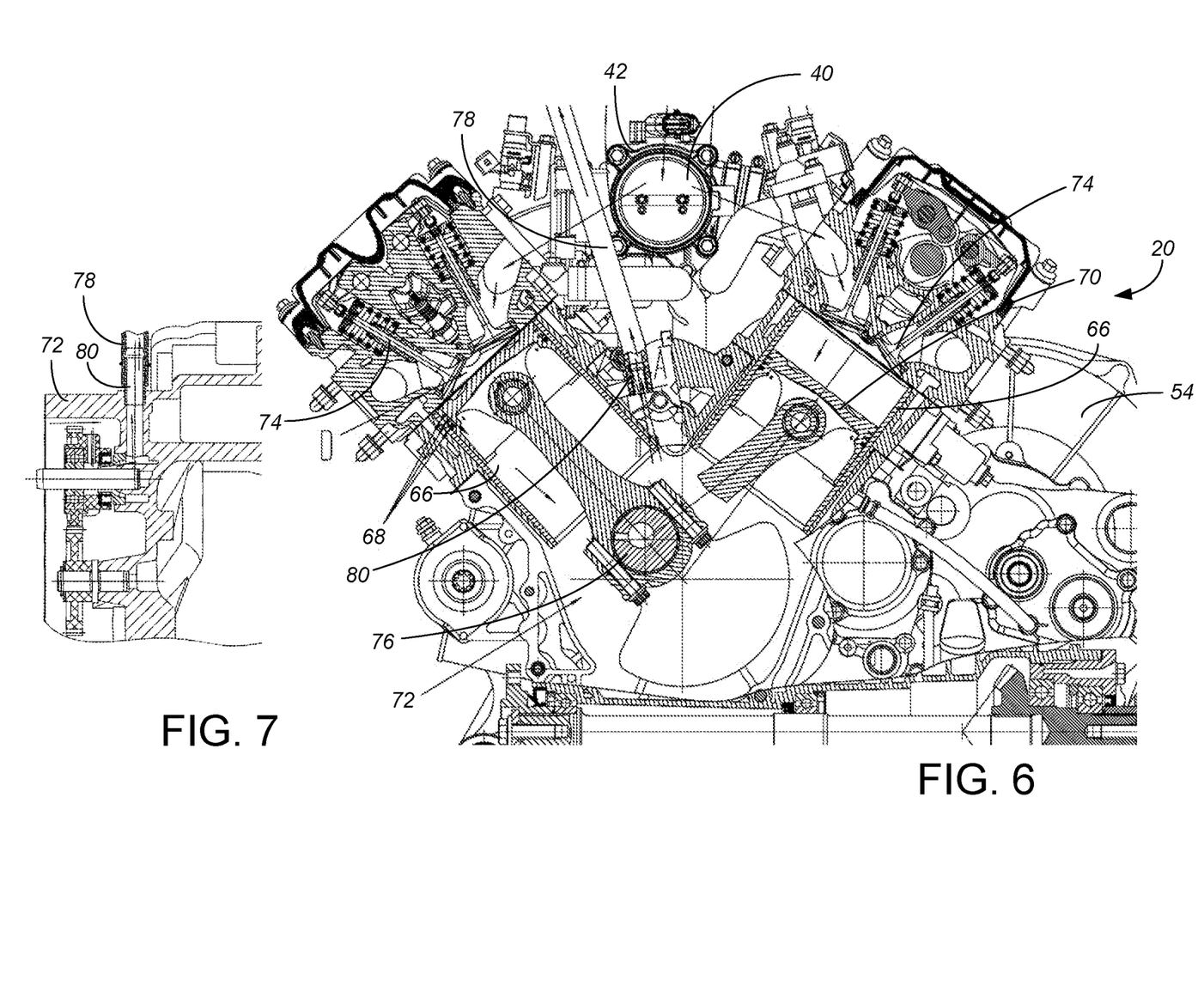
FIG. 6 is a passenger's side view of the engine, largely in cross section to show the connection between the air intake system and both the intake manifold and the crankcase, as well as the vapor leakage around the pistons.
FIG. 7 is a partial cross-sectional view of FIG. 6, better depicting the vapor connection between the crankcase and the leaking vapor recovery pipe.
Figure 8:
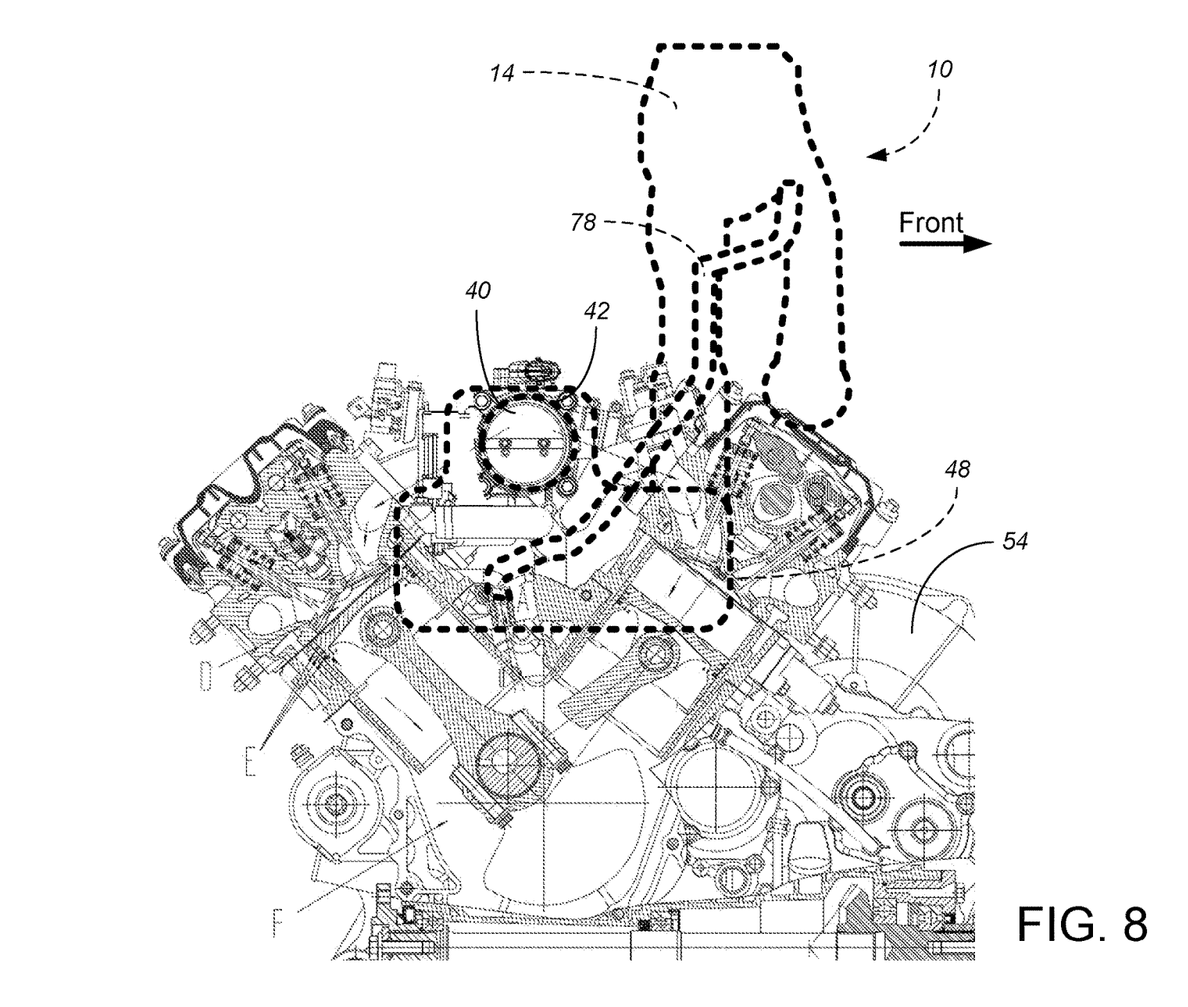
FIG. 8 shows the layout of the preferred air intake system of FIGS. 1-5 relative to the cross-sectional view of FIG. 6. D denotes where vapor enters the cylinder, E denotes leakage past the piston ring, F denotes the crankcase interior, and A denotes where vapor enters the recovery tube.

As best shown in FIGS. 4 and 5, the air surge tank 48 is preferably quite close to the air inlet 42 of the engine 20, nearer the air inlet 42 than the air cleaner 14 is to the air inlet 42. More preferably, the distance from the air surge tank 48 to the air inlet 42 is less than the distance from the air surge tank 48 to the air cleaner 14, and most preferably the distance from the air surge tank 48 to the air inlet 42 is about one quarter the distance from the air surge tank 48 to the air cleaner 14. Use of the surge tank 48 and placing the surge tank 48 this close to the air inlet 42 of the engine 20 enables the air cleaner 14 to be positioned slightly further from the air inlet 42 of the engine 20 without consequence, allowing designers more flexibility in deciding where to position the air cleaner 14 relative to the engine 20.

Additionally, the air surge tank 48 is preferably positioned lower in elevation than the air inlet 42 of the engine 20. To the extent that any entrained particles or dust in the air escape through the air filter, they may gravitationally fall out in the air surge tank 48. Positioning the air surge tank 48 lower in elevation than the air inlet 42 of the engine 20 ensures that particles cannot gravitational fall from the air surge tank 48 to reenter the air stream into the engine 20. Thus, as best seen in FIG. 4, the preferred embodiment places the air surge tank 48 just to the side of the engine 20, on the opposite side as the continuously variable transmission (CVT) 54. With the preferred engine layout in an ATV or UV, this places the surge tank 48 on the passenger side of the engine 20, although alternative engine layout orientations are possible.

In the most preferred embodiment, the surge tank 48 includes a tank bottom casing or shell 56 and a tank upper cover 58 that is disposed at the top of the tank bottom shell 56. The air inlet and air outlet of the surge tank 48 are disposed on the upper cover 58. By having a split structure with the air inlet and the air outlet on the upper cover 58, when maintenance or cleaning of the surge tank 48 is required, only the bottom shell 56 needs to be disassembled from the rest of the air intake system 10, reducing maintenance and reinstallation difficulty. Thus, the overall layout of the preferred air intake system 10 is quite compact with respect to the engine 20, while still allowing appropriate and easy access both for regular replacement of the air filter element and for less frequent removal of the surge tank bottom shell 56.

In the preferred embodiment, the air flow out of the air cleaner 14 is horizontal, and the path to the air surge tank 48 includes a curved tube 60 as well as the descending tube 50. The air flow through the top of the surge tank 48 is horizontal, before turning to a horizontal flow through the throttle connecting pipe 52 to the air inlet 42 of the engine 20. The throttle connecting pipe 52 is preferably a flexible structure, both for ease of assembly relative to the engine 20 and to provide some give to withstand and absorb engine vibration without breaking over the life of the vehicle. The preferred throttle connecting pipe 52 includes a ribbed, accordion profile to ensure adequate flexibility.

The air intake system 10 must of course be mounted relative to the vehicle and/or the engine 20. To assist in such mounting, the preferred air intake tube 12 includes a mounting bracket or flange 62 with a bolt hole therethrough, and the preferred surge tank 48 includes two mounting brackets or flanges 64 each with a bolt hole therethrough. The mounting flanges on the surge tank 48 are preferably on the tank upper cover 58, so the tank upper cover 58 remains mounted when the bottom shell 56 is removed during maintenance. Many other mounting arrangements are also possible.

The filtered air through the surge tank 48 is delivered to the engine 20. As well known with internal combustion engines, the intake air is mixed with fuel as a vapor, and the air-fuel vapor is compressed and then ignited in the cylinder 66 for the working stroke of the engine 20. Because the piston ring 68 is not typically continuous but instead has a gap between its ends to enable assembly into a circumferential groove on the piston 70, when the air-fuel vapor is compressed in the cylinder 66 there can be a small amount of air-fuel vapor leakage past the piston 70 into the crankcase 72. This leakage is sometimes referred to as "blowby" gas, which is not expelled through the exhaust valve 74. In older engines, the tightness of the piston ring seal between the cylinder 66 and the piston 70 can increase the amount of air-fuel vapor that may leak around the piston 70 into the crankcase 72 around the crankshaft 76. The gas pressure within the crankcase 72 will be higher than atmospheric pressure at certain times, such as when one or both pistons 72 are descending. If not accounted for, the air-fuel vapor may escape past the oil seal from the crankcase 72 and into the environment, causing pollution.

The preferred air intake system 10 includes a leaking vapor recovery pipe 78, creating closed crankcase ventilation. A vapor recovery outlet 80 is formed in the crankcase 72, and the leaking vapor recovery pipe 78 connects this outlet 80 back into the air intake system 10. Preferably the vapor recovery outlet 80 is at the top of the crankcase 72, such as between two cylinders 66 in a two cylinder engine 20 with the cylinders 66 angled at a V-configuration as shown. The vapor recovery pipe 78 leads back to the air intake system 10 prior to the throttle 40. In the most preferred embodiment, the vapor recovery pipe 78 ties back in on the input side of the air cleaner 14, so the recovered vapor is fed back through the air filter. With the vapor recovery outlet 80 and the leaking vapor recovery pipe 78 positioned as shown, there is little pick-up of oil aerosol and no need for an air-oil separator.

While the engine 20 is running, the interior of the air cleaner 14 is generally lower than atmosphere. During each cycle of the engine 20, the peak pressure in the crankcase 72 is higher than the air pressure in the air cleaner 14. With the leaking vapor recovery pipe 78, the pressure in the crankcase 72 is reduced to always be less than atmosphere throughout the time the engine 20 is running, so none of the leaking vapor escapes directly into the environment. Instead, the leaking vapor recovery pipe 78 causes the air-fuel vapor mixture to eventually be fed back into the cylinders 66 to be more fully combusted, reducing pollution. By directing the leaking vapor recovery pipe 78 back into the air intake system 10 upstream of the air filter (and because air is a compressible gas), the air travel through the air filter and surge tank 48 largely prevents any of the pressure variations in the crankcase 72 from affecting the consistent air flow through the throttle 40.

Although the present invention has been described with reference to preferred embodiments, workers skilled in the art will recognize that changes may be made in form and detail without departing from the spirit and scope of the invention

The invention claimed is:

1. An internal combustion engine of an off road vehicle, comprising:
   one or two cylinders each with a reciprocating piston therein, motion of the piston driving a crankshaft within a crankcase;
   a throttle controlling intake air flow into the cylinder, and an exhaust valve controlling flow of exhaust gas out of the cylinder; and
   an air intake system for treating air comprising:
      an air cleaner for housing an air filter element therein, the air cleaner located at the top of the air intake system above the cylinder, the air cleaner having an air cleaner inlet and an air cleaner outlet;
      a surge tank connected to air cleaner by a connecting tube, the surge tank having a surge tank cross-sectional area which is greater than a cross-sectional area of the connecting tube for buffering air flow;
      an outlet tube extending from the surge tank to the throttle, the outlet tube having an outlet tube cross-sectional area which is smaller than the surge tank cross-sectional area, wherein the outlet tube of the air intake system extends horizontally from a top of the surge tank to the throttle, with a bottom of the surge tank being at an elevation lower than the throttle; and
      a vapor recovery pipe running from the crankcase to the air cleaner for vapor flow from the crankcase to the air cleaner upstream of the air filter, wherein the vapor recovery pipe connects to the crankcase at an elevation below the top of the surge tank but above a bottom of the surge tank.

2. The internal combustion engine of claim 1, wherein the connecting tube is longer than the outlet tube.

3. The internal combustion engine of claim 1, wherein the connecting tube descends from the air cleaner and connects to the top of surge tank.

4. The internal combustion engine of claim 3, wherein the surge tank comprises a tank bottom casing removably connected to a tank upper cover, with the connecting tube and the outlet tube connecting into the tank upper cover.

5. The internal combustion engine of claim 4, wherein the tank upper cover comprises a securing bracket with a bolt hole therethrough, and with the tank bottom being connected solely to the tank upper cover, so the tank bottom casing can be removed from the tank upper cover and cleaned without further disassembly of the air intake system.

6. The internal combustion engine of claim 1, wherein the surge tank is closer to the throttle than it is to the air cleaner.

7. The internal combustion engine of claim 1 with two cylinders arranged in a V, with the vapor recovery pipe connecting to the crankcase between the cylinders.

8. The internal combustion engine of claim 1, wherein the air cleaner comprises a rear cover and a filter housing, with the rear cover latched to the filter housing along a top edge of the rear cover.

9. An air intake system for an off road vehicle, comprising:
   an air cleaner for housing an air filter element therein, the air cleaner located at a top of the air intake system to be disposed above an engine of the off road vehicle, the air cleaner having an air cleaner inlet and an air cleaner outlet;
   a descending tube connected to the air cleaner and extending downward from the air cleaner outlet with a descending tube cross sectional area for carrying filtered air;
   a surge tank connected to the descending tube, the surge tank having a surge tank cross-sectional area which is greater than the descending tube cross-sectional area for buffering air flow;
   an outlet tube extending from the surge tank for transferring buffered air flow to an engine of the off road vehicle for combustion, the outlet tube having an outlet tube cross-sectional area which is smaller than the surge tank cross-sectional area; and
   a vapor recovery pipe running from an elevation below the outlet tube to the air cleaner upstream of the air filter;
   wherein the surge tank comprises a tank bottom casing removably connected to a tank upper cover, with the descending tube and the outlet tube connecting into the tank upper cover, and wherein the descending tube is longer than the outlet tube.

10. The air intake system of claim 9, wherein the descending tube connects to a top of surge tank.

11. The air intake system of claim 9, wherein the air cleaner comprises a rear cover and a filter housing, with the rear cover latched to the filter housing along a top edge of the rear cover.

12. The air intake system of claim 9, wherein the vapor recovery pipe extends to below a top of the surge tank but above a bottom of the surge tank.

13. The air intake system of claim 9, wherein the tank upper cover comprises a securing bracket with a bolt hole therethrough, and with the tank bottom being connected solely to the tank upper cover, so the tank bottom casing can be removed from the tank upper cover and cleaned without further disassembly of the air intake system.

\* \* \* \* \*